United States Patent
Biesiada et al.

[11] Patent Number: 6,111,004
[45] Date of Patent: Aug. 29, 2000

[54] PROPANEDIOL-DERIVED POLYESTERS AS PVC PLASTICIZERS

[75] Inventors: Keith Biesiada; Michael Fisch, both of Wayne; Richard Peveler, Woodcliff Lake, all of N.J.

[73] Assignee: Velsicol Chemical Corporation, Rosemont, Ill.

[21] Appl. No.: 09/005,956

[22] Filed: Jan. 9, 1998

[51] Int. Cl.$^7$ .............................. C08L 5/11; C08L 55/00
[52] U.S. Cl. ................. 524/311; 524/314; 524/569; 525/437; 525/445; 528/272; 528/300; 528/302; 528/307
[58] Field of Search ............................ 524/311, 569, 524/314; 528/272, 300, 302, 307; 525/437, 445

[56] References Cited

U.S. PATENT DOCUMENTS 5,281,647  1/1994  Eapen ........................ 524/314

*Primary Examiner*—Peter D. Mulcahy
*Attorney, Agent, or Firm*—Scully, Scott, Murphy & Presser

[57] ABSTRACT

Disclosed are polymeric plasticizers of the formula (1)

$$R^a\text{—C(O)—(O—G—OC(O)—(CH}_2)_{4\text{-}12}\text{—C(O))}_{1\text{-}12}\text{—O—G—O—C(O)—}R^b \quad (1)$$

wherein $R^a$ and $R^b$ are each $C_2$–$C_{22}$ straight saturated alkyl groups, and wherein each G group is 1,2-propanediyl or 2-methylpropane-1,3-diyl such that both types of G groups are present in a ratio to each other of 3:1 to 1:3.

19 Claims, No Drawings

PROPANEDIOL-DERIVED POLYESTERS AS PVC PLASTICIZERS

BACKGROUND OF THE INVENTION

1. Field of the Invention

The present invention relates to plasticizers, known generally as polymeric plasticizers, which are derived from certain polyesters. The present invention further relates to the use of such plasticizers in the formulation of polymeric compositions, particularly compositions based on polyvinyl chloride polymers, and to such compositions.

2. Background of the Invention

Plasticizers in general are a well-known type of chemical constituent useful in the formulation of polymeric compositions. They perform useful functions including imparting flexibility, processability and the like to the polymer composition compared to the properties that would be exhibited by the same composition in the absence of the plasticizer component.

So-called polymeric plasticizers have been described in the past which, in addition to the plasticizing properties they impart, are believed to exhibit additional useful properties such as low volatility; low extractability from the polymer into water, soap and detergent solutions, organic solvents, oil, and the like; and minimal migration from the polymer matrix into other materials which come into contact with the polymer containing the polymeric plasticizer. For instance, refrigerator gaskets need to be flexible at room temperature and lower temperatures, and thus require fabrication with a plasticizer component, yet such gaskets can come into contact with adjacent refrigerator parts made of e.g. polystyrene. Migration of the plasticizer component from the gasket into the polystyrene could result in unsightly roughening and frosting of the polystyrene surface (conventionally called "marring"), and the loss of plasticizer from the gasket can in time lead to an undesirable loss of flexibility of the gasket. Appropriately chosen plasticizers, such as in particular polymeric plasticizers, reduce or eliminate this problem.

In general, the desirable properties associated with polymeric plasticizers tend to be exhibited to a greater degree with increasing molecular weight of the plasticizer. However, increased molecular weight of the plasticizer can tend to increase other properties such as the viscosity of the material and the processing time required in compounding the plasticizer component into the polymer. In addition, increased molecular weight tends to decrease the plasticizing efficiency, that is, a greater weight concentration of the plasticizer is required to accomplish a given degree of plasticization of the polymer (as measured, for instance, by hardness or tensile properties).

Thus, there remains a need for polymeric plasticizers which exhibit an optimum combination of plasticization and the associated desirable properties such as low extractability, migration, and the like, while minimizing the less desirable properties such as lessened efficiency and more difficult processing.

3. Description of the Prior Art

The prior art has recognized polymeric plasticizers but has not disclosed or suggested the particular plasticizers of the present invention and the desirable combination of properties afforded thereby.

For instance, published Japanese Patent Application No. 59(1984)-202,181 (Kokai No. 61(1986)-78,827) discloses polyester plasticizers of the general formula L—G(—D—G)$_n$—L in which L is the residue of a monobasic acid said to contain 2 to 22 carbon atoms, G is the residue of 2-methyl-1,3-propanediol, D is the residue of a dibasic acid such as azelaic acid, sebacic acid, or an aromatic dibasic acid such as phthalic acid, isophthalic acid, terephthalic acid, and their anhydrides, or an alicyclic dibasic acid such as cyclohexane dicarboxylic acid. While this publication recognizes in general virtues of a plasticizer containing a 2-methyl-1,3-propanediol based polyester it does not suggest the particular structure of the polymeric plasticizers which are the subject of the present invention.

U.S. Pat. No. 5,281,647 also discloses polymeric plasticizers derived from polyesters, wherein the polyester is derived from a diacid containing 5 to 13 carbon atoms and a highly hindered diol, that is, a diol exhibiting a highly branched structure. This patent also does not recognize the particular structure of the polymeric plasticizers which are the subject of the present invention.

SUMMARY OF THE INVENTION

One aspect of the present invention is polymeric plasticizers of the formula (1)

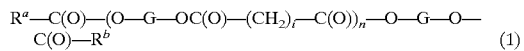

$$R^a\text{—C(O)—(O—G—OC(O)—(CH}_2)_i\text{—C(O))}_n\text{—O—G—O—C(O)—R}^b \quad (1)$$

wherein n is 1 to 12; i is 4 to 12;

$R^a$ and $R^b$ are the same or different and each is independently a straight-chain saturated alkyl group containing 2 to 22 carbon atoms; and each G group is selected from the group consisting of 1,2-propanediyl and 2-methylpropane-1,3-diyl, provided that the ratio of 1,2-propanediyl groups to 2-methylpropane-1,3-diyl groups in the plasticizer of formula (1) is 3:1 to 1:3.

Another aspect of the present invention comprises polymer compositions, particularly polyvinyl chloride polymer compositions, comprising one or more plasticizers of the foregoing formula (1) in an amount effective to plasticize the composition.

DETAILED DESCRIPTION OF THE INVENTION

Referring to the foregoing formula (1), the polymeric plasticizer of the present invention contains n ester units, wherein n is 1 to 12 and more preferably 1 to 10. Each of those ester units, in turn, is composed of a component —O—G—O— and a dicarboxyl unit —C(O)—(CH$_2$)$_i$—C(O)—. Each group G consists of 1,2-propanediyl or 2-methylpropane-1,3-diyl. That is, referring to the most convenient manner of synthesizing this polyester, each G group is the residue of 1,2-propanediol or 2-methylpropane-1,3-diol.

As will be pointed out below, the particular combination and ratio of each of these two types of G groups in the plasticizers of the present invention is a particularly significant source of the improved properties attributable to this invention.

In the dicarboxy units identified above, the subscript i denotes that there is a chain of 4 to 12 saturated carbon atoms between the carboxyl functional groups. Referring again to the most straightforward manner of synthesizing the plasticizers of the present invention, each dicarboxy unit of the plasticizers can be derived from a straight chain, saturated diacid containing a total of 6 to 14 carbon atoms including the carboxy carbons. In one particularly preferred example, the diacid is adipic acid such that the subscript i is 4.

Referring again to formula (1), the substituents $R^a$ and $R^b$ referred to therein are capping units which are derived from straight chain saturated fatty acids containing 2 to 22 carbon atoms. These fatty acids may be the same or different. Each contains preferably 12 to 22 carbon atoms, and yet more preferably 14 to 18 carbon atoms.

In the polymer plasticizers of the present invention, it is necessary that a certain ratio be observed between the amounts of the two types of G groups. That is, the ratio of the number of 1,2-propanediyl groups to the number of 2-methyl propane-1,3-diyl groups should be in the range of 3:1 to 1:3. More preferably, this range is 2:1 to 1:2. In a particularly preferred invention the two G groups are present in a ratio of about 1:1.

The plasticizers of the present invention can be synthesized in any of a number of ways. The choice of synthetic route can be determined in accordance with the nature of the end product desired, particularly on the basis of whether the desired end product is to comprise a mixture of compounds of formula (1) or whether it is desired to obtain only one particular compound corresponding to formula (1). For instance, one may react one or more diacids of the formula HOOC—$(CH_2)_i$—COOH with one or more diols of the formula HO—G—OH to form a polyester intermediate. The reaction is carried out under esterifying conditions; that is, the reaction conditions should be such that the diol and diacid react so as to form the desired ester linkages. Identification of esterifying conditions is a matter of routine skill to those of ordinary skill in this art. Since it is necessary for the resulting polyester intermediate to be terminated with hydroxyl groups at both ends, a stoichiometric excess of the amount of diol over the amount of diacid should be present in the reaction. The excess can be slightly in excess of 1:1 up to 10:1 or more, depending on the reaction conditions and the reactants chosen.

In selecting the reactants to use in this reaction, it is necessary to provide sufficient amounts of both 1,2-propanediol and 2-methylpropane-1,3-diol such that the polyester intermediate which is formed contains residues of both types of diol in amounts which bear the required ratio falling in the range of 3:1 to 1:3.

The resultant hydroxyl-terminated polyester intermediate is then reacted with fatty acids $R^a$COOH and $R^b$COOH under esterifying conditions under which the carboxylic groups react with the terminal hydroxyl groups. As indicated above, the reactants $R^a$COOH and $R^b$COOH can be the same, or different. The total amount of such fatty acid or acids should be no more than the stoichiometric equivalent of the amount of the polyester intermediate present. It is highly preferred that the final product which is added to the PVC polymeric resin not contain free fatty acids, e.g. compounds of the formula $R^a$COOH or $R^b$COOH, to avoid the risk that undesired exudate from the PVC would appear. Thus, in synthesizing the fatty acid-capped intermediate there should be a maximum of two moles of fatty acid capping agent per mole of polyester intermediate. Typically, there will be 1.0 to 1.3 moles of fatty acid capping agent per mole of polyester intermediate. The presence of mono-capped polyester intermediate is much more tolerable than the presence of unreacted fatty acid.

Alternatively, the desired plasticizer of formula (1) can be obtained by adding appropriate amounts of one or more diacids, of the formula HOOC—$(CH_2)i$—COOH, diols of the formula HO—G—OH, and fatty acid(s) at one time into one reactor, under esterifying conditions effective to form the desired dicapped polyester. Here, too, sufficient amounts of 1,2-propanediol and 2-methyl propane-1,3-diol must be present to satisfy the ratio of one to the other of 1:3 to 3:1; and the amounts of the fatty acid reactants should be adjusted so that no unreacted fatty acid remains.

The plasticizers of the present invention are effective in imparting plasticizing properties to polymer composition. Examples of polymers which can be plasticized with the plasticizers of the present are vinyl halide resins, especially polyvinyl chloride resin. The plasticizers of the present invention are used in effective amounts to plasticize the PVC or other polymeric resin. Effective plasticization is afforded generally by adding an amount constituting about 30 to about 80 phr (parts by weight of plasticizer per 100 parts by weight of polymeric resin), and preferably 40 to 75 phr.

The plasticizers of the present invention are preferably used to advantage in combination with vinyl halide resins, preferably polyvinyl chloride resins. The term "polyvinyl chloride" as used herein is inclusive of any polymer formed at least in part of the recurring group $(—CHCl—CX_2—)_p$ and having a chlorine content in excess of 40%. In this formula, each of the X groups can be either hydrogen or chlorine, and p is the number of units in each polymer chain. In polyvinyl chloride homopolymers, each of the X groups can be either hydrogen or chlorine, and p is the number of units in each polymer chain. In polyvinyl chloride homopolymers, each of the X groups is hydrogen. Thus, the terms "PVC" and "polyvinyl chloride" include not only polyvinyl chloride homopolymers but also after-chlorinated polyvinyl chlorides, as well as copolymers of vinyl chloride in a major proportion such as copolymers of vinyl chloride and vinyl acetate, copolymers of vinyl chloride with maleic or fumaric acids or esters, and copolymers of vinyl chloride with styrene. The plasticizers are effective also with mixtures of polyvinyl chloride in major proportion with a minor proportion of other synthetic resins such as chlorinated polyethylene or copolymers of acrylonitrile, butylene and styrene.

The polymeric plasticizers of the present invention can readily be compounded into the polymer matrix, such as PVC, by known techniques employed to distribute polymer additives uniformly within the polymer.

The plasticized composition can also contain conventional additional additives such as antioxidants, lubricity agents, flame retardants, fillers, pigments, and the like, in relative amounts of each effective to fulfill the desired functions of each such ingredient. These ingredients can be added, if desired, prior to, during, or subsequent to the step in which the plasticizer of the present invention is compounded into the polymer composition.

The polymeric plasticizers of the present invention impart to the polymer superior plasticization in combination with improved resistance to abstraction (extractability or migration) of the plasticizer from the polymer matrix. In addition, the plasticizers of the present invention exhibit excellent durability, plasticizing efficiency (that is, degree of plasticization per unit weight of material employed), as well as improved low-temperature flexibility imparted to the polymer matrix.

The following examples are provided to furnish additional illustrative disclosure of the present invention. These examples are not intended to limit the scope of that which is regarded as the invention.

EXAMPLE 1

The materials listed below were charged into a 1-liter flask, with the given proportions:

| Adipic acid | 315.2 grams |
| --- | --- |
| 2-methyl-1,3-propanediol | 107.9 grams |
| 1,2-propanediol | 91.1 grams |
| Fatty acid mixture | 68.4 grams |

The materials were heated, with a dry nitrogen sparge, to 220° C. 0.1 grams of dibutyltin oxide was added. Water of condensation was continually removed. The reaction was continued to an acid value of 2.0 or less.

EXAMPLE 2

The same procedure as in Example 1 was followed, with the following materials in the given proportions:

| Adipic acid | 311.6 grams |
| --- | --- |
| 1,3-butanediol | 212.2 grams |
| Fatty acid mixture | 57.2 grams |
| Dibutyltin oxide | 0.1 grams |

EXAMPLE 3

The products obtained in Examples 1 and 2 were incorporated separately into resins with the following formulation:

| PVC resin | 100 phr |
| --- | --- |
| Polymeric plasticizer (Ex. 1 or 2) | 70 phr |
| Epoxidized soybean oil | 5 phr |
| Ba/Zn Solid Stabilizer | 2 phr |
| Calcium carbonate | 30 phr |

Resin formulations containing, separately, the polymeric plasticizers prepared in Examples 1 and 2 were milled into sheets at 170° C. Test data obtained for each sheet is given in Table 1 below:

TABLE 1

| Ester as prepared in: | Example 1 | Example 2 |
| --- | --- | --- |
| Tensile strength, psi | 2621 | 2485 |
| % Elongation | 340.6 | 314.3 |
| Modulus at 100% Elongation | 1340 | 1271 |
| Soapy water extraction (% plasticizer lost) | 1.02 | 2.63 |
| Carbon volatility (% plasticizer lost) | 0.66 | 0.70 |
| Oil extraction (% plasticizer absorbed) | 0.09 | 0.11 |
| Shore "A" Hardness | 85 | 84 |

It can readily be seen that the resin formulation prepared according to this invention has significantly better physical properties, due unexpectedly to the difference in the identity of the polyester that had been added to the formulation.

What is claimed is:

1. A polymeric plasticizer of the formula $R^a$—C(O)—(O—G—OC(O)—(CH$_2$)$_i$—C(O))$_n$—O—G—O—C(O)—$R^b$, wherein n is 1 to 12; i is 4 to 12; $R^a$ and $R^b$ are the same or different and each is independently a straight-chain saturated alkyl group containing 2 to 22 carbon atoms; and each G group is 1,2-propanediyl or 2-methylpropane-1,3-diyl, with the provisos that both radicals are present and in a 1,2-propanediyl to 2-methylpropane-1,3-diyl ratio of 3:1 to 1:3.

2. A plasticizer according to claim 1 wherein $R^a$ and $R^b$ are the same or different and each is independently a straight-chain saturated alkyl group containing 12 to 22 carbon atoms.

3. A plasticizer according to claim 2 wherein the ratio of 1,2-propanediyl groups to 2-methylpropane-1,3-diyl groups is 2:1 to 1:2.

4. A plasticizer according to claim 2 wherein the ratio of 1,2-propanediyl groups to 2-methylpropane-1,3-diyl groups is about 1:1.

5. A plasticizer according to claim 2 wherein i is 4.

6. A process of plasticizing a polymer comprising adding to said polymer one or more plasticizers of the formula $R^a$—C(O)—(O—G—OC(O)—(CH$_2$)$_i$—C(O))$_n$—O—G—O—C(O)—$R^b$, wherein n is 1 to 12; i is 4 to 12; $R^a$ and $R^b$ are the same or different and each is independently a straight-chain saturated alkyl group containing 2 to 22 carbon atoms; and each G group is 1,2-propanediyl or 2-methylpropane-1,3-diyl, with the provisos that both radicals are present and in a 1,2-propanediyl to 2-methylpropane-1,3-diyl ratio of 3:1 to 1:3, in an amount of said one or more plasticizers effective to plasticize said polymer.

7. A process according to claim 6 wherein said amount added of said one or more plasticizers of formula (1) corresponds to 30 to 80 phr based on said polymer.

8. A process according to claim 6 wherein said polymer is a PVC polymer.

9. A process according to claim 6 wherein $R^a$ and $R^b$ are the same or different and each is independently a straight-chain saturated alkyl group containing 12 to 22 carbon atoms.

10. A process according to claim 6 wherein the ratio of 1,2-propanediyl groups to 2-methylpropane-1,3-diyl groups is 2:1 to 1:2.

11. A process according to claim 6 wherein the ratio of 1,2-propanediyl groups to 2-methylpropane-1,3-diyl groups is about 1:1.

12. A process according to claim 6 wherein i is 4.

13. A plasticized polymer comprising one or more plasticizers of the formula $R^a$—C(O)—(O—G—OC(O)—(CH$_2$)$_i$—C(O))$_n$—O—G—O—C(O)—$R^b$, wherein n is 1 to 12; i is 4 to 12; $R^a$ and $R^b$ are the same or different and each is independently a straight-chain saturated alkyl group containing 2 to 22 carbon atoms; and each G group is 1,2-propanediyl or 2-methylpropane-1,3-diyl, with the provisos that both radicals are present and in a 1,2-propanediyl to 2-methylpropane-1,3-diyl ratio of 3:1 to 1:3, wherein said one or more plasticizers of said formula is effective to plasticize said polymer.

14. A plasticized polymer in accordance with claim 13 wherein said one or more plasticizers of formula (1) comprise 30 to 80 phr based on said polymer.

15. A plasticized polymer in accordance with claim 13 wherein said polymer is a PVC polymer.

16. A plasticized polymer in accordance with claim 12 wherein $R^a$ and $R^b$ are the same or different and each is independently a straight-chain saturated alkyl group containing 12 to 22 carbon atoms.

17. A plasticized polymer in accordance with claim 12 wherein the ratio of 1,2-propanediyl groups to 2-methylpropane-1,3-diyl groups is 2:1 to 1:2.

18. A plasticized polymer in accordance with claim 12 wherein the ratio of 1,2-propanediyl groups to 2-methylpropane-1,3-diyl groups is about 1:1.

19. A plasticized polymer in accordance with claim 12 wherein i is 4.

* * * * *